(12) United States Patent
Maryfield et al.

(10) Patent No.: US 9,678,099 B2
(45) Date of Patent: Jun. 13, 2017

(54) ATHERMALIZED OPTICS FOR LASER WIND SENSING

(71) Applicant: Cubic Corporation, San Diego, CA (US)

(72) Inventors: Tony Maryfield, Poway, CA (US); Mahyar Dadkah, San Diego, CA (US); Christian Cugnetti, San Diego, CA (US); Nam-Hyong Kim, San Jose, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 14/696,004

(22) Filed: Apr. 24, 2015

(65) Prior Publication Data

US 2016/0202282 A1 Jul. 14, 2016

Related U.S. Application Data

(60) Provisional application No. 61/983,917, filed on Apr. 24, 2014, provisional application No. 62/138,237, filed on Mar. 25, 2015.

(51) Int. Cl.
*F41G 3/08* (2006.01)
*G01P 5/26* (2006.01)
*G02B 17/00* (2006.01)
*G02B 13/14* (2006.01)

(52) U.S. Cl.
CPC .............. *G01P 5/26* (2013.01); *F41G 3/08* (2013.01); *G02B 13/14* (2013.01); *G02B 17/008* (2013.01)

(58) Field of Classification Search
USPC .............. 396/322, 325–327, 139; 348/42, 49
See application file for complete search history.

(56) References Cited

U.S. PATENT DOCUMENTS

| | | | | |
|---|---|---|---|---|
| 5,838,489 | A * | 11/1998 | Erdmann | G02B 13/146 359/356 |
| 7,280,273 | B2 * | 10/2007 | Tejada | G02B 13/146 359/355 |
| 7,606,485 | B2 * | 10/2009 | Ohashi | H04N 13/0217 348/49 |
| 9,347,742 | B2 | 5/2016 | Varshneya | |

(Continued)

FOREIGN PATENT DOCUMENTS

WO    2005/050254 A1    6/2005

OTHER PUBLICATIONS

International Search Report and Written Opinion mailed Jan. 26, 2016 for International Application No. PCT/US2015/027603, filed Apr. 24, 2015; all pages.

*Primary Examiner* — Minh Phan
(74) *Attorney, Agent, or Firm* — Kilpatrick Townsend & Stockton LLP (57) ABSTRACT

Techniques are disclosed for providing an optical assembly to provide stereoscopic images of a reflected laser spot to a camera for wind measurement. According to certain embodiments of the invention, an optical assembly can include left and right (or first and second) subassemblies having lens groups and reflective elements that cause light traveling left and right subassemblies to follow similar paths to focus on respective left and right portions of a camera. The camera can then use left and right images of reflected laser light to determine wind based on turbulence patterns in the left and right images.

10 Claims, 7 Drawing Sheets

(56) References Cited

U.S. PATENT DOCUMENTS

| | | | |
|---|---|---|---|
| 2002/0149691 A1* | 10/2002 | Pereira | G01B 11/24 |
| | | | 348/335 |
| 2004/0263612 A1* | 12/2004 | Harter, Jr. | H04N 13/021 |
| | | | 348/49 |
| 2009/0123144 A1* | 5/2009 | Maezono | G03B 35/00 |
| | | | 396/327 |
| 2009/0223072 A1 | 9/2009 | Morin et al. | |
| 2009/0279070 A1* | 11/2009 | Ueno | G01B 11/026 |
| | | | 356/28.5 |
| 2010/0128136 A1 | 5/2010 | Belenkii | |
| 2010/0253932 A1* | 10/2010 | Shapira | F41G 1/44 |
| | | | 356/28 |
| 2010/0321477 A1* | 12/2010 | Iwasaki | H04N 13/0217 |
| | | | 348/49 |
| 2015/0176948 A1* | 6/2015 | Varshneya | F41G 3/08 |
| | | | 235/404 |
| 2015/0176949 A1 | 6/2015 | Varshneya et al. | |

* cited by examiner

ATHERMALIZED OPTICS FOR LASER WIND SENSING

CROSS-REFERENCES TO RELATED APPLICATIONS

The present application claims benefit under 35 USC 119(e) of U.S. Provisional Application No. 61/983,917, filed on Apr. 24, 2014, entitled "Integrated Targeting Riflescope With Laser Wind Sensing And Ballistic Computer" and U.S. Provisional Application No. 62/138,237, filed on Mar. 25, 2015, entitled "Athermalized Optics For Side By Side SWIR Images Used In Wind Sensing," both of which are incorporated by reference herein in their entirety.

BACKGROUND

Optical devices such as optical scopes and rangefinders can be utilized in a variety of applications. In military applications, such devices can be mounted to weapons to enable tracking of a target and increase accuracy in aiming the weapon. Systems utilized by snipers can bring an added degree of sophistication because many conditions that can impact long-range shots, including range, wind, elevation, and more. Weapon-mounted optical systems can integrate sensors and devices to provide information regarding these conditions. However, gathering information regarding wind has traditionally been difficult.

BRIEF SUMMARY

Techniques are disclosed for providing an optical assembly to provide stereoscopic images of a reflected laser spot to a camera for wind measurement. According to certain embodiments of the invention, an optical assembly can include left and right (or first and second) subassemblies having lens groups and reflective elements that cause light traveling left and right subassemblies to follow similar paths to focus on respective left and right portions of a camera. The camera can then use left and right images of reflected laser light to determine wind based on turbulence patterns in the left and right images.

An example stereoscopic optical assembly for laser wind sensing, according to the description, includes first and second subassemblies. Each of the first and the second subassemblies comprise elements including a first set of one or more lenses, a second set of one or more lenses, a first reflective element, and a second reflective element. For each of the first and second subassemblies, the elements are configured to cause at least a portion of the light entering the subassembly to travel through the first set of one or more lenses, through the second set of one or more lenses, reflect off of the first reflective element, and reflect off of the second reflective element toward an output of the subassembly. The stereoscopic optical assembly further includes a camera comprising a pixel array having first set of pixels and a second set of pixels. The output of the first subassembly is configured to direct light toward the first set of pixels of the camera, and the output of the second subassembly is configured to direct light toward the second set of pixels of the camera.

The example stereoscopic optical assembly can also include one or more of the following features. The camera may include a short-wave infrared (SWIR) camera. For each of the first and second subassemblies, the first set of one or more lenses, the second set of one or more lenses, or both, may include a negative silicon lens. Each of the first and second subassemblies may further comprise a narrow-band filter. Each of the first and second subassemblies may further comprise a field stop disposed between the first set of one or more lenses and the second set of one or more lenses. The stereoscopic optical assembly may comprise a light-absorption element disposed between the first and second subassemblies at the camera, and/or a photodiode, where the first reflective element for one or both of the first or second subassemblies includes a beam splitter configured to direct a portion of the light toward the photodiode. For each of the first and second subassemblies, the first reflective element may be steerably mounted within the optical assembly to enable an adjustment of a direction in which the light travels. For each of the first and second subassemblies, the first set of one or more lenses is adjustably mounted to enable an adjustment of a focal point of the light.

An example optical device for laser wind sensing, according to the description, includes a laser transmitter, a camera, and receiving optics comprising first and second subassemblies. Each of the first and second subassemblies are configured to cause at least a portion light entering the subassembly to travel through a first set of one or more lenses, through a second set of one or more lenses, reflect off of a first reflective element, and reflect off of a second reflective element toward a set of pixels of the camera. The first and second subassemblies are configured to direct light toward first and second sets of pixels of the camera, respectively.

The example optical device may include one or more of the following features. The optical device may include a body housing the laser transmitter, the camera, and the receiving optics, where the body comprises aluminum. The optical device may include a processing unit configured to determine, from the light directed toward the first and second sets of pixels of the camera, a direction of wind with respect to the optical device. The optical device may include a display configured to display an indication of the determined direction of wind. For each of the first and second subassemblies, the first set of one or more lenses, the second set of one or more lenses, or both, may include a negative silicon lens. Each of the first and second subassemblies may further comprise a narrow-band filter. Each of the first and second subassemblies may further comprise a field stop disposed between the first set of one or more lenses and the second set of one or more lenses. The optical device may include a photodiode, wherein the first reflective element for one or both of the first or second subassemblies includes a beam splitter configured to direct a portion of the light toward the photodiode. The optical device may include a processing unit configured to determine, from the portion of the light directed toward the photodiode, a range of an object from the optical device. For each of the first and second subassemblies, the first reflective element may be steerably mounted within the optical assembly to enable an adjustment of a direction in which the light travels. For each of the first and second subassemblies, the first set of one or more lenses is adjustably mounted to enable an adjustment of a focal point of the light.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

In the appended figures, similar components and/or features may have the same reference label. Further, various components of the same type may be distinguished by following the reference label by a dash and a second label that distinguishes among the similar components. If only the first reference label is used in the specification, the description is applicable to any or all of the similar components having the same first reference label irrespective of the second reference label.

DETAILED DESCRIPTION OF THE INVENTION

The ensuing description provides embodiments only, and is not intended to limit the scope, applicability or configuration of the disclosure. Rather, the ensuing description of the embodiments will provide those skilled in the art with an enabling description for implementing an embodiment. It is understood that various changes may be made in the function and arrangement of elements without departing from the spirit and scope.

Optical devices such as optical scopes and rangefinders can be utilized in a variety of applications. In military applications, such devices can be mounted to weapons to enable tracking of a target and increase accuracy in aiming the weapon. Systems utilized by snipers can bring an added degree of sophistication because many conditions that can impact long-range shots, including range, wind, elevation, and more. Weapon-mounted optical systems can integrate sensors and devices to provide information regarding these conditions. However, gathering information regarding wind has traditionally been difficult.

Embodiments of the present invention enable for the detection of crosswinds through the use of laser light. Wind can modulate reflected laser light, causing scintillation patterns which can be detected in images of the reflected laser light. By taking stereoscopic (e.g., right and left) images of reflected laser light and comparing scintillation patterns between the images (using, for example, algorithms such as those developed by Trex Enterprises Corporation of San Diego, Calif.), a speed and direction of the wind can be determined. In weapon-mounted optical systems, this information can be provided to a user and/or utilized by a ballistic computer to determine how the wind might impact the trajectory of a bullet fired from the weapon. For long-range (i.e., sniper) shooting, this information can significantly increase the likelihood of making an accurate shot.

Figure 1:
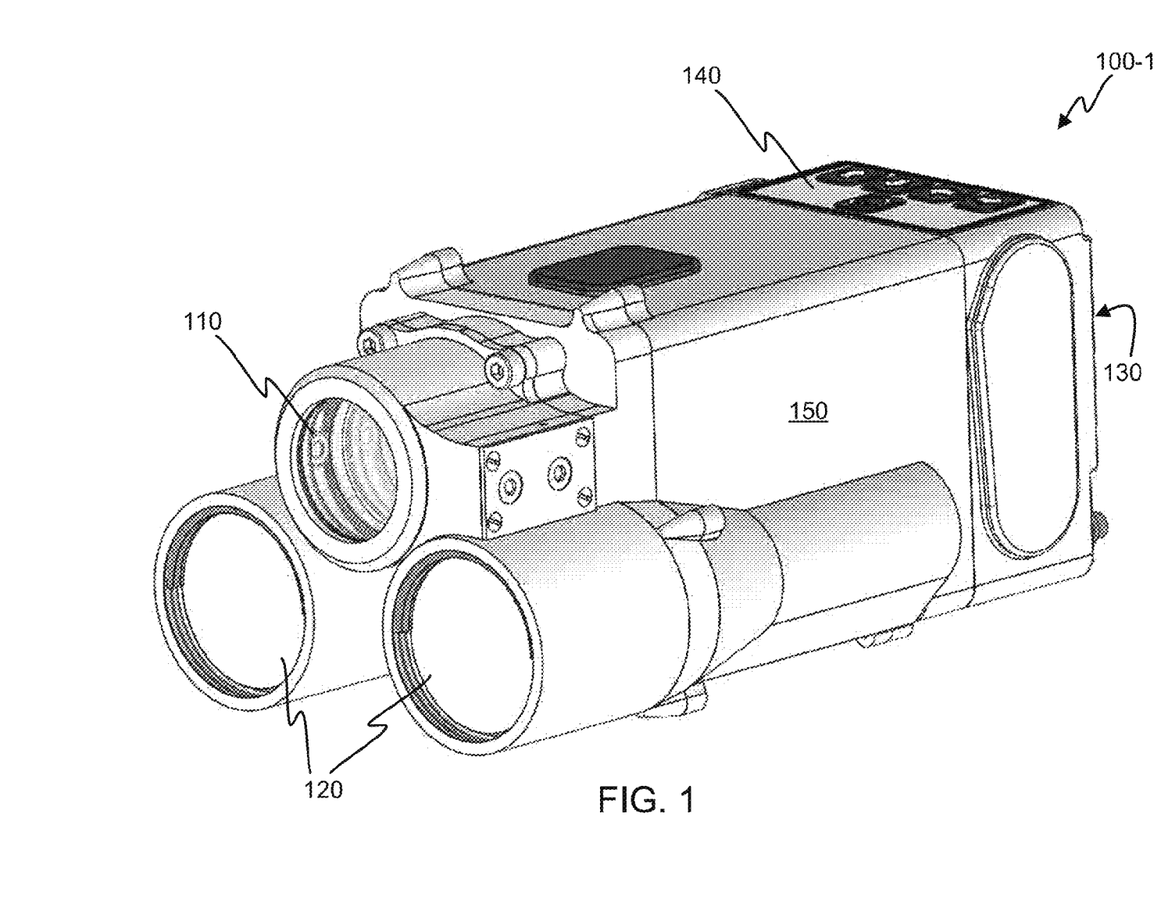
FIG. 1 is an auxiliary view of an optical device for laser wind sensing, according to an embodiment.

FIG. 1 is an auxiliary view of an optical device 100-1 for laser wind sensing, according to an embodiment. The optical device 100-1 may be weapon mounted, for example, above and/or onto an optical scope mounted on the weapon. Alternatively, in the case of a two-person sniper team, for example, the optical device 100-1 may be mounted to a spotting scope. In some embodiments, in which a display is provided on the optical device, the optical device may provide an image of a target. Thus, a separate optical scope or spotting scope may not be needed. Size, weight, and/or other traits can vary, depending on desired features.

As shown in FIG. 1, the optical device 100-1 can include optics 110 through which a laser light is transmitted, and stereoscopic (e.g., right and left) receiving optics 120 through which reflected laser light is received. The optical device 100-1 may further include a display, e.g., on a back surface 130 of the optical device 100-1, to show one or more images received through one or both of the stereoscopic receiving optics 120, and a control panel 140 for proving a user interface through which user input may be received.

The body 150 of the optical device 100-1 and/or components housed therein can include any of a variety of materials, depending on desired functionality, manufacturing concerns, and/or other factors. In some embodiments, the body comprises aluminum, based on the relative high thermal conductivity, strength, cheap cost, relative ease of casting/machinability, and/or other concerns.

Figure 7:
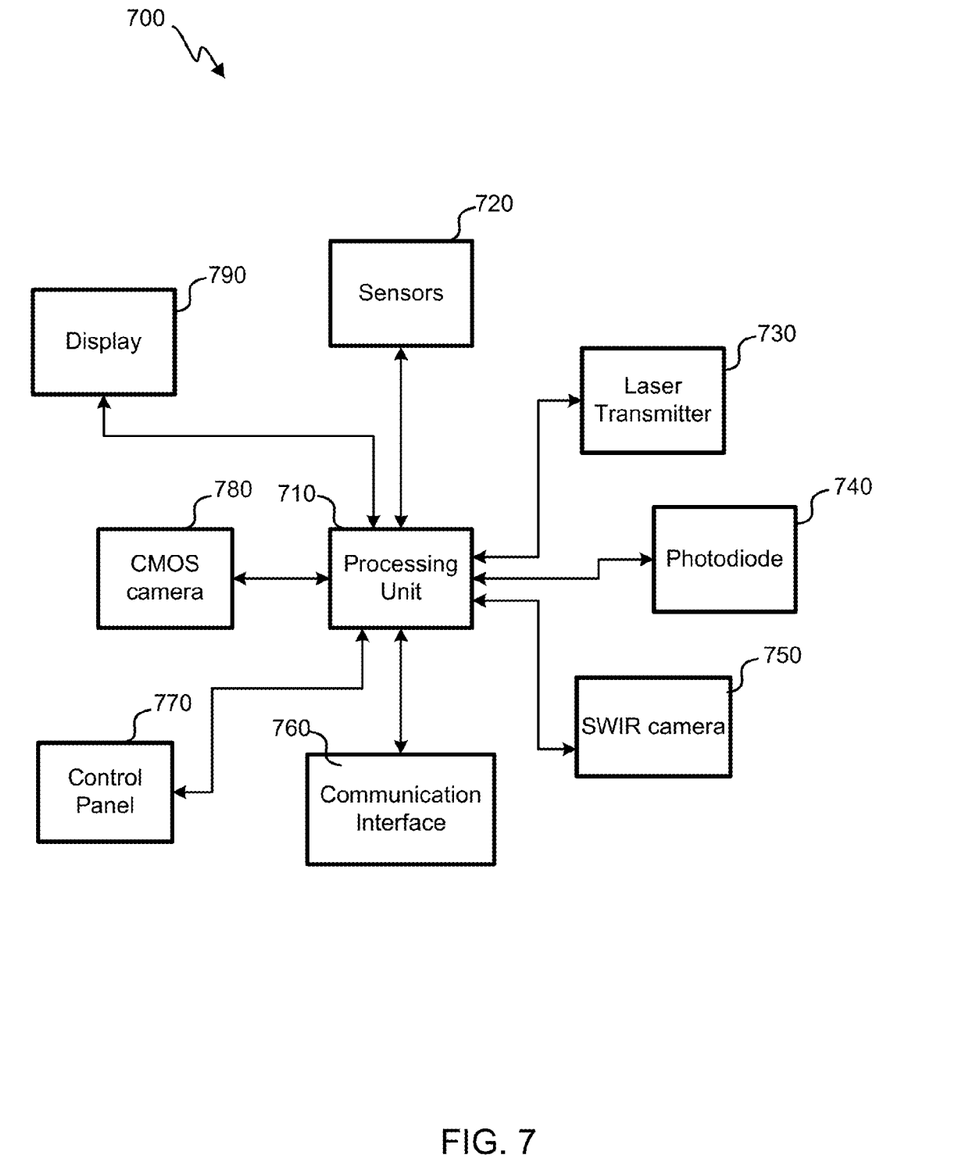
FIG. 7 is a simplified block diagram of electrical components of an optical device, according to an embodiment.

The optical device 100-1 may have various sensors and/or other features integrated therein for providing additional input to a user. The optical device 100-1 may have, for example, an integrated GPS receiver, laser range finder, orientation sensors (e.g., compass, gyroscope, accelerometer, etc.), and the like to provide additional information regarding a target at which the optical device 100-1 is pointed, the environment in which the target and/or optical device 100-1 is located, and the like. The optical device 100-1 may further include a processor (e.g., as shown in FIG. 7 below) executing a ballistic computer to compute an offset aim point (or other ballistic solution) to a target based on range, wind, and or other information provided by sensors internal and/or external to the optical device 100-1. This information may be communicated to a user via a display and/or provided via communication interface (e.g., wired, optical, wireless, etc.) to one or more devices, such as the riflescope display adapter discussed in U.S. patent application Ser. No. 14/543,761 entitled "Compact Riflescope Display Adapter." The optical device 100-1 may further include a battery to power the various electrical components of the optical device 100-1.

Use of the optical device 100-1 may vary, depending on desired functionality. According to some embodiments, a user may aim the optical device 100-1 (or if the optical device 100-1 is mounted to a weapon, the weapon itself) toward a target. The user may press a button (e.g., on the control panel 140) and/or navigate through graphical user interface shown on a display to initiate wind sensing. Laser light is then transmitted through the optics 110 onto a target and reflected laser light is received through each of the receiving optics 120. Using an optical assembly described below, received laser light is directed to a camera to capture images, which are then provided to a processor to determine the wind measurements. In some embodiments, a separate process may be used to determine a range of the target using the same laser.

Figure 2:
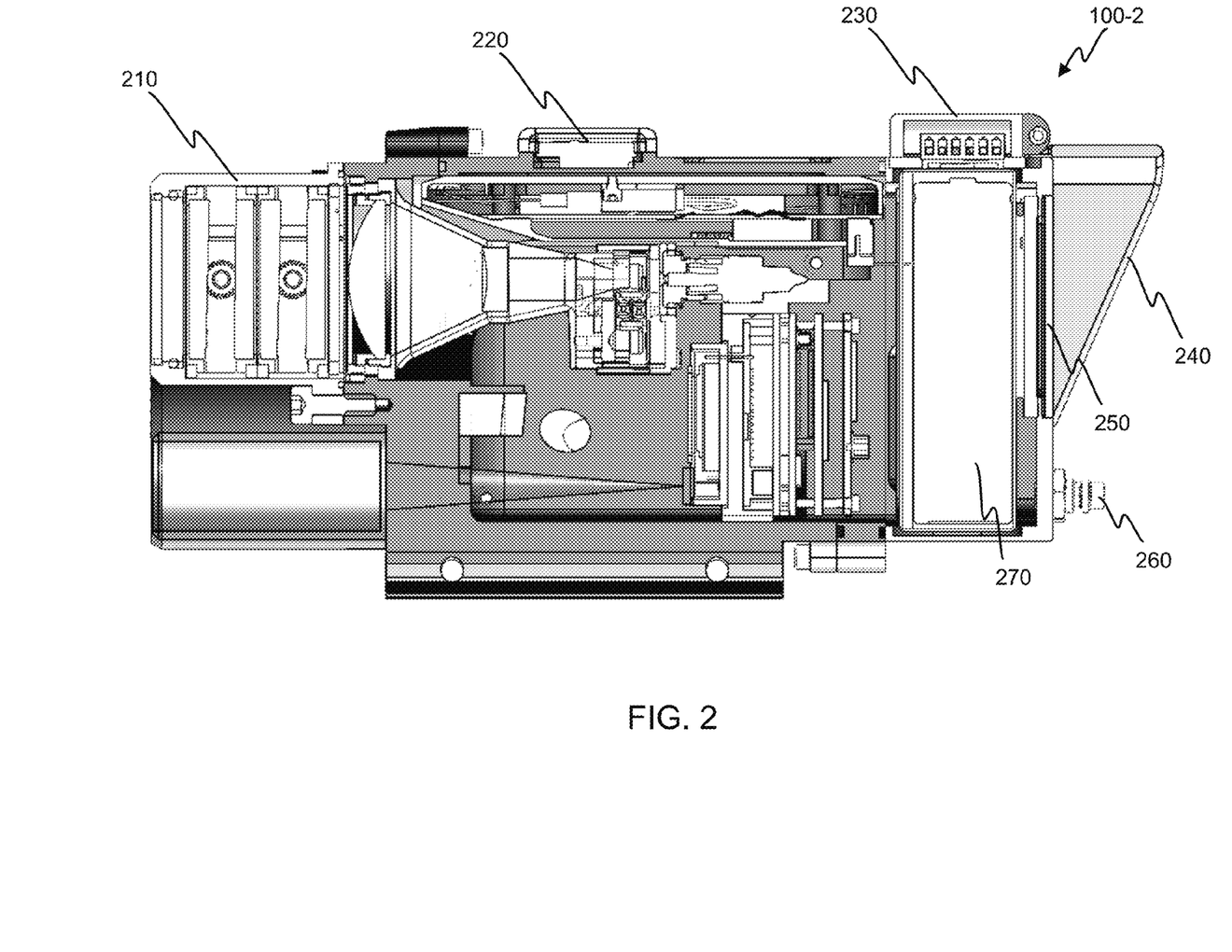
FIG. 2 is an illustration of a two-dimensional cross section of an optical device similar to the optical device of FIG. 1, according to an embodiment.

FIG. 2 is an illustration of a two-dimensional cross section of an embodiment of an optical device 100-2, which is similar to the optical device 100-1 of FIG. 1. Components, too, may be similar to those described in regard to the optical device 100-1 of FIG. 1. In FIG. 2, however, internal components are shown. As with all figures herein, FIG. 2 provides a non-limiting embodiment. Other embodiments may add, omit, rearrange, combine, and/or separate components, depending on desired functionality. A person of ordinary skill in the art will recognize many variations to the optical device 100-2 shown.

The optical device 100-2 in FIG. 2 illustrates the use of a steering mechanism 210 for the transmitted laser light. The steering mechanism may, for example, include Risley prisms capable of steering the transmitted laser light (within the field of view of the receiving optics). The steering mechanism may be electrically driven, and may be fully automated or manually adjusted (e.g., based on user input). The steerability of the laser light can enable the optical device 100-2 to be boresighted to a separate optical scope (e.g., a weapon-mounted scope). Thus, when boresighted, it can enable laser-based range finding and/or wind sensing of a target in the reticle of the weapon-mounted scope. Precision Risley prisms may be used in the steering mechanism to maintain boresight under repeated gun shocks.

A GPS receiver 220 may be mounted to the top of the optical device 100-2 (or elsewhere) to provide location information of the optical device 100-2. As detailed elsewhere herein, location information can, for example, be used in calculating a ballistic solution.

The optical device 100-2 further includes a compartment 270 with an opening 230 allowing for the housing and replacement of a battery to power the various electronics of the optical device 100-2. A circuit board (e.g., the motherboard) containing a processor and/or other electrical components may also be housed in and/or near the compartment 270.

The optical device 100-2 may further comprise a display 250. As previously indicated, the display can provide images received from a camera (infrared and/or visible light), a graphical user interface, and the like. The display may utilize any of a variety of technologies, including liquid-crystal display (LCD), light-emitting diode (LED), organic LED (OLED), active-matrix OLED (AMOLED), and the like. The optical device 100-2 may further include a visor 240 to help the viewability of the display in sunlight.

The optical device 100-2 may further comprise a communication port 260. The communication port 260 may, for example, utilize wired electrical and/or optical communication technologies to communicate information (e.g., ballistic information, offset aim point information, a confidence metric, etc.) to one or more external devices. In some embodiments, the optical device 100-2 may include a wireless communication interface.

Figure 3:
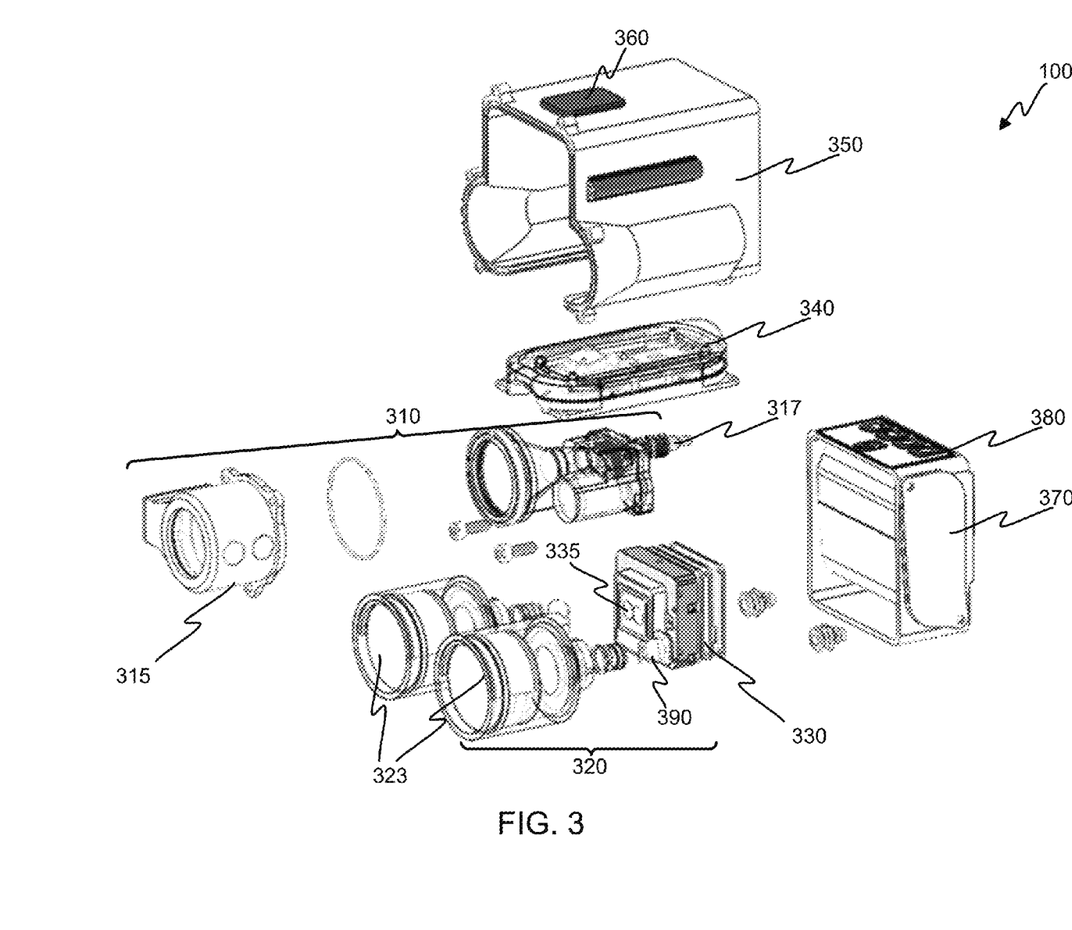
FIG. 3 is an illustrated of an exploded view of some of the components of an optical device, according to an embodiment.

FIG. 3 is an illustrated of an exploded view of some of the components of an optical device 100, according to an embodiment, such as the optical device 100-1 of FIG. 1 and/or the optical device 100-2 of FIG. 2. The exploded view here is intended to provide additional detail on some of the components that may be included in an optical device 100. Illustrated components include a housing 350 with an embedded GPS antenna 360, a battery box 370 (with a control panel 380 thereon), a laser module 340, a transmission optical assembly 310 (corresponding to the optics 110 of FIG. 1), and a receiving optical assembly 320.

Components within the transmission optical assembly 310 can vary, depending on desired functionality. In the embodiment illustrated in FIG. 3, the transmission optical assembly 310 includes a Risley beam steering module 315 capable of steering the transmitted laser beam as described previously. The transmission optical assembly 310 further includes a variable beam divergence module 317 capable of varying divergence of the transmitted laser light. Accordingly, the transmitted laser light may be modified as needed to suit the application in which the laser light is used.

In one embodiment, the transmission optical assembly 310 can provide selectable divergences (e.g., 100 μR, 200 μR, 300 μR, and 4 mR (in wide beam mode)). The embodiment further provides simultaneous background illumination and measurement functionality for imaging, wind sensing, and boresighting. The embodiment further provides Risley prisms that steer the transmitted laser 50 μR per step, with a 1 degree adjustment range. The embodiment further has an operating temperature range of −20 C to +60 C.

The laser module 340 is coupled to the transmission optical assembly 310, and provides the laser light to be transmitted. According to some embodiments, the laser module can comprise a master oscillator power amplifier (MOPA) laser capable of transmitting pulsed and/or continuous wave (CW) laser light. (Pulsed laser light can be used for laser range finding, and CW laser light can be used for the wind sensing functionality described herein.) In some embodiments, the laser is a high-efficiency MOPA laser operating at a 1550 nm wavelength and utilizing a Fabry-Perot seed that spreads the spectrum sufficiently to reduce background speckle from the target during wind sensing (because the speckle can create noise that can impede a wind measurement). In one embodiment, for example, the line width achieved with dramatically reduced speckle was 10 nm. The wide line width also sweeps out more stored energy in the MOPA, dramatically improving the efficiency compared to common off-the-shelf lasers in the commercial market.

The receiving optical assembly 320 can include stereoscopic subassemblies 323 (corresponding to receiving optics 120 in FIG. 1), a camera 330, and a photodiode 390 (shown in FIG. 3 as mounted on the camera 330). As described in further detail herein, each subassembly 323 (e.g., right and left subassemblies) can direct light to a respective portion (right and left portion) of a pixel array 335 of the camera 330. In some embodiments, each subassembly 323 comprises a 35 mm aperture that can be used for wind sensing, and target imaging. As detailed further herein, the receiving optical assembly 320 can utilize a stable imaging system (over temperature) to maintain the spot density and position on the pixel array 335 of the camera 330 so that the processing electronics can yield a good signal-to-noise ratio (SNR). As detailed herein, the receiving optical assembly 320 can include features to enable temperature stabilization, rejection of off-axis stray light, spectral filtering to reject the sunlit background, factory alignment capability, shared optics with a laser range finder, and focusing of the side by side images on the same pixel array 335 of a camera 330.

The camera can selected based on its ability to sense reflected laser light. In some embodiments, the camera comprises a short-wave infrared (SWIR) camera. As detailed above, each subassembly 323 can focus an image on a portion of the pixel array. During wind sensing measurements, an algorithm may be used to select reduced regions of interest in the pixel array 335 (e.g., around the spot, in each image, where the laser light is shown) for spot intensity measurements versus time, and that data can then be processed for wind estimation. The camera can be communicatively coupled with a processing unit to perform the wind estimation.

Figure 4:
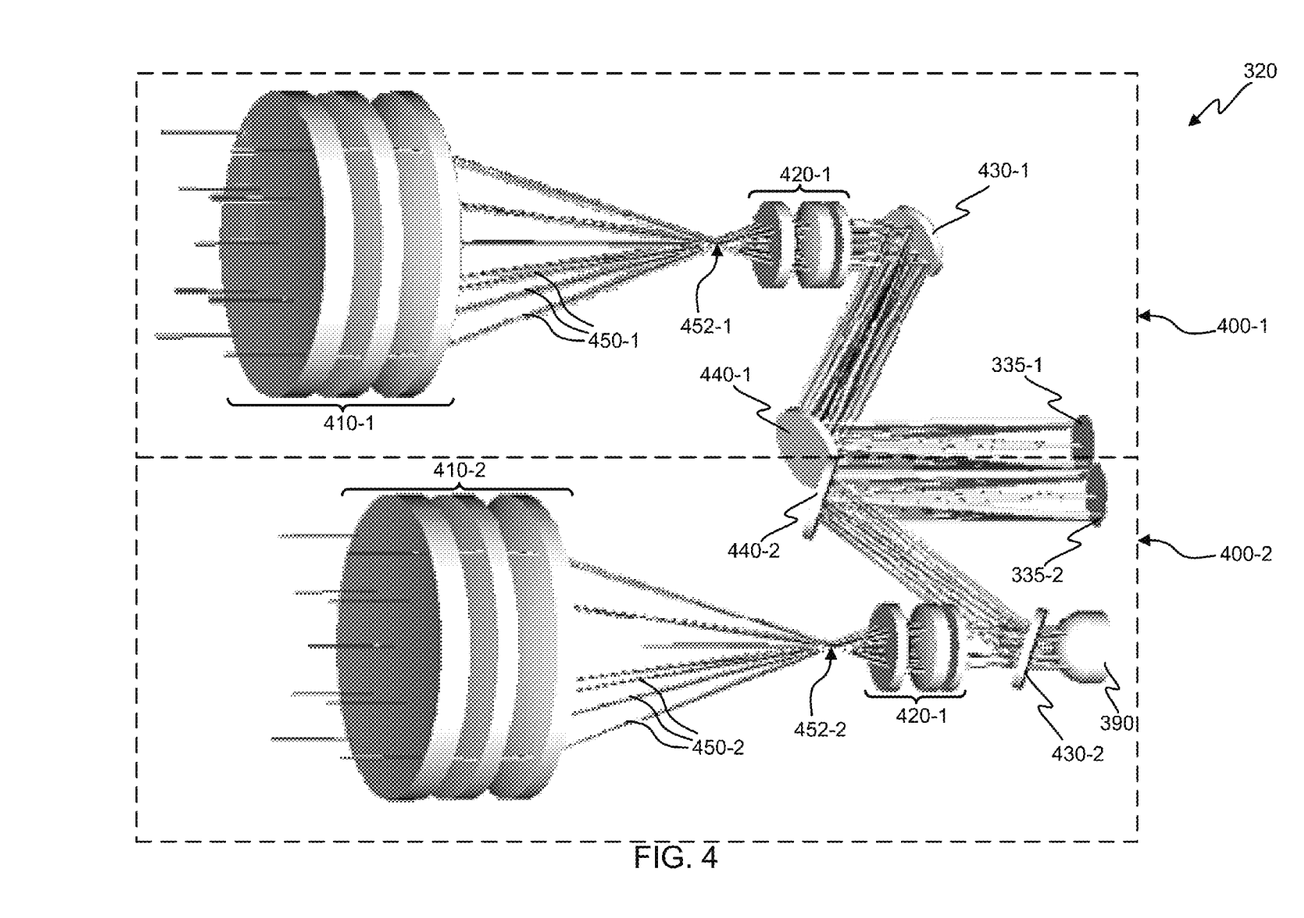
FIG. 4 is a simplified auxiliary view of a receiving optical assembly, according to an embodiment.

FIG. 4 is a simplified auxiliary view of a receiving optical assembly 320, according to an embodiment. As illustrated, the receiving optical assembly 320 can include subassemblies 400-1, 400-2 that nearly mirror each other. Further illustrated are lines 450 representing paths of light travelling through the optical assembly 320. (To avoid clutter, not all lines 450 representing paths of light are labeled.) In the illustration, components are labeled with a "-1" or a "-2" to indicate they belong to subassembly 400-1 or 400-2, respectively.

Depending on the desired functionality, elements of the receiving optical assembly 320 may vary. In general, however, elements include, for each subassembly 400, a first lens group 410, a second lens group 420, a first reflective element 430, and second reflective element 440. For each subassembly 400 the elements are configured to cause at least a portion of the light entering the subassembly to travel through the first lens group 410, through the second lens group 420, reflect off of the first reflective element 430, and reflect off of the second reflective element 440 toward an output of the subassembly, which is focused on a portion of the pixel array 335 (shown) of a camera 330 (not shown in FIG. 4.) The first subassembly 400-1 is configured to focus incoming light on the first portion of the pixel array 335-1, and the second subassembly 400-2 is configured to focus incoming light on the second portion of the pixel array 335-2. The camera 330 therefore receives two side-by-side images (e.g., left and right) of substantially the same scene. In one embodiment, for example, the camera 330 comprises a SWIR camera with a 640×512 pixel array 335. The pixel array 335 is separated in two (one for each subassembly 400) to create two 320×512 images. A series of images (e.g., video) may be collected over a period of time, and laser light reflected on a target in the images can be compared to determine scintillation patterns indicative of a crosswind between the optical device 100 and the target.

The first lens groups 410 can include one or more lenses configured to provide separation of images (for stereoscopic wind sensing). The first lens groups 410 can focus light at a first focal plane 452 at which a filed stop (not shown) may be provided around the beam waist for stray light rejection.

Stray light rejection may further be achieved by the inclusion of one or more light-absorption elements. For example, a blinder (not shown) can be placed in between the first and second portions of the pixel array 335 (e.g., along the dotted line that separates subassemblies 400, between the second reflective elements 440 and the pixel array 335). The blinder can, for example, be made of a thin, flat material to shield one subassembly 400 from any light from the other subassembly 400, to prevent crosstalk and/or ghosting. Embodiments may include a blinder that is painted or colored a flat black to help maximize light absorption.

As indicated earlier, some embodiments may include a body comprising aluminum due to advantages aluminum provides in thermal conductivity, machinability, and so forth. Because the aluminum body can expand or contract with increased or decreased temperature, the focal length of the receiving optical assembly 320 may change over a range of temperature as well. Accordingly first lens groups 410 can further include lenses intended to counteract changes in focal length over temperature due to expansion/contraction in the body and/or mounting material(s). The same or similar approaches can succeed in athermalizing the transmit laser path as well.

Figure 5:
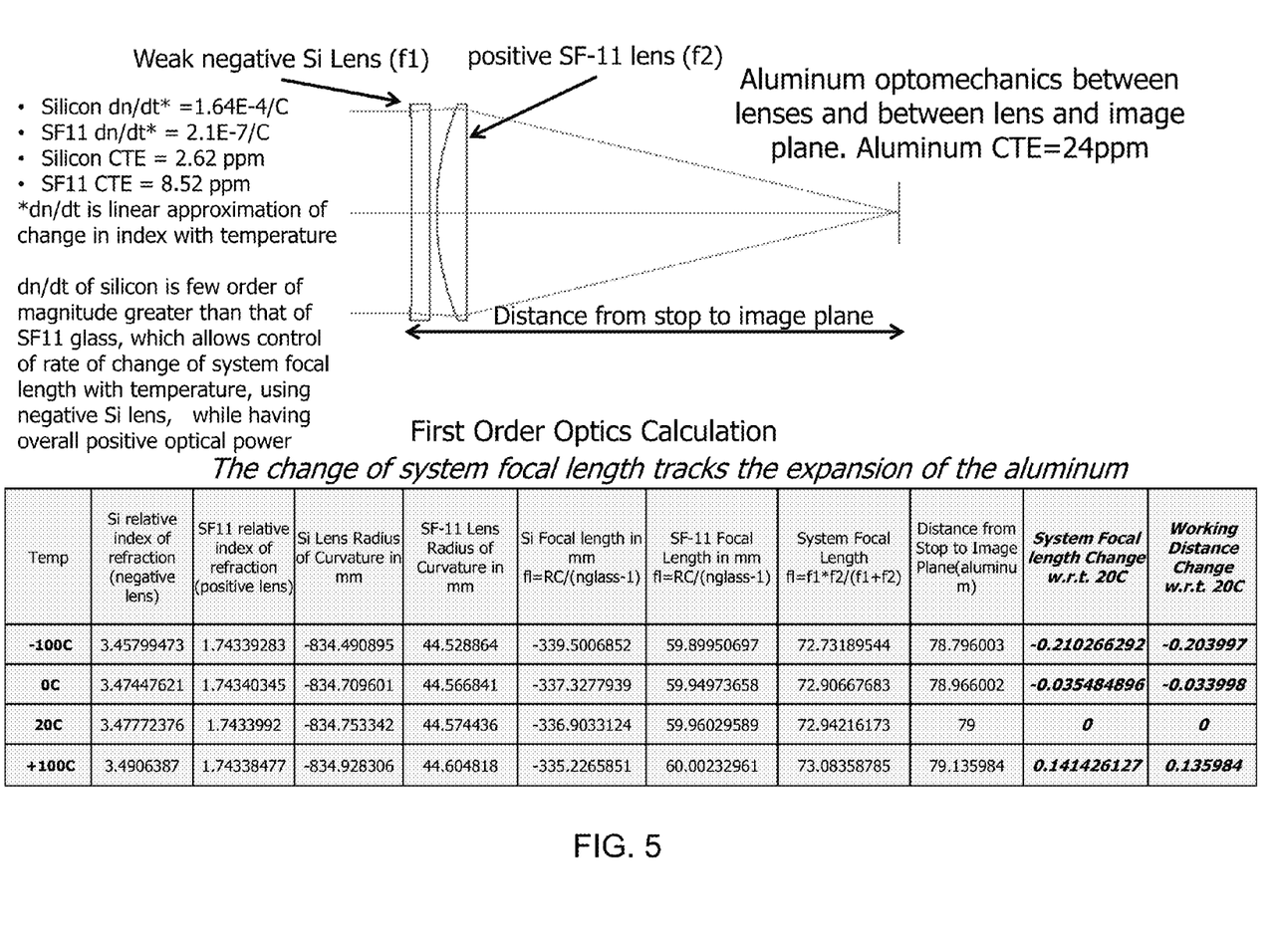
FIG. 5 is a chart providing information on an example simulation conducted to achieve athermalization of a simple optical assembly.

FIG. 5 provides information on an example simulation conducted to achieve such athermalization. Here, the simulation involves a lens group having two lenses, a relatively strong positive SF-11 lens and a relatively weak negative silicon (Si) lens. Here, the change in index of refraction over temperature (dn/dt) and the coefficient of thermal expansion (CTE) of the relatively weak negative silicon lens largely offset changes in focal length due to the dn/dt and CTE of the SF-11 lens, as well as the CTE of the aluminum optomechanics between the lenses and image plane. A similar solution can be utilized in the receiving optical assembly 320 (and/or other optical assemblies of an optical device 100) to provide athermalization. In some embodiments, for example, the first lens groups 410 and/or second lens groups 420 may include a relatively weak negative silicon lens. In alternative embodiments, other materials other than SF-11 and silicon may be used. (BK7, for example, is another glass that may be used.)

Figure 6:
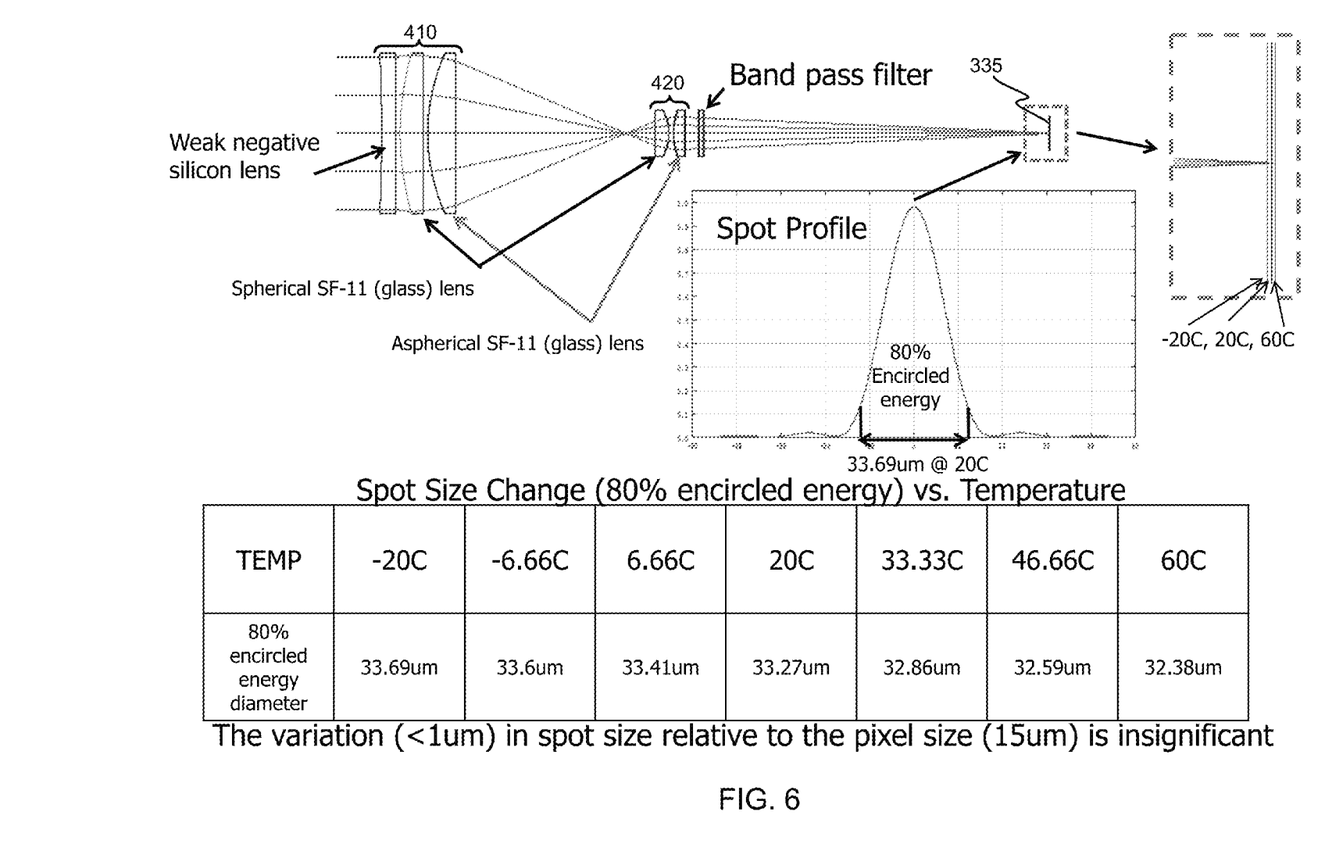
FIG. 6 is a chart providing information on an example simulation, illustrating athermalization applied to an optical system similar to the receiving optics provided herein.

FIG. 6 provides information on an example simulation, illustrating athermalization applied to an optical system having a first lens group 410, a second lens group 420, and a pixel array 335, similar to the optical assembly 320 of FIGS. 3 and 4. Here, the first lens group includes a weak negative silicon lens to provide athermalization. As indicated in the table on FIG. 6 the spot size change over a range of temperatures from -20 C to 60 C is very small.

Additionally, as shown in FIG. 6, a band pass (narrowband) filter may be included in optical assembly 320. Such a filter can filter out sunlight and other light while enabling light substantially at or near the wavelength of the transmitted laser to pass. By eliminating the extra light, the band pass filter can facilitate in spot finding of the reflected laser beam in the received image. A particular embodiment of a receiving optical assembly 320, for example, includes a 373 mm focal length and a narrow band spectral filter (e.g. 50 nm) placed in the path, which provides background sunlight rejection for imaging the spot with little background imaging present.

Referring again to FIG. 4, the receiving optical assembly 320 may, in one of the subassemblies 400, include a photodiode 390 for laser range finding and/or other laser measurements. In some embodiments, the photodiode 390 may be an avalanche photodiode (APD). An example of an optically-contacted APD on a silicon lens that may be used here (which can achieve greater than three times the field of view than a regular APD) is provided in U.S. Pat. No. 8,558,337 entitled "Wide Field Of View Optical Receiver," which is incorporated herein in its entirety. With the photodiode 390, the optical assembly 320 can enable both laser-based stereoscopic wind sensing and laser range finding.

To permit light to reach the photodiode 390, the first reflective element 430 may be a beam splitter configured to direct a portion of the light toward the photodiode 390. The amount of light provided to the photodiode 390 and the pixel array 335 may vary, depending on desired functionality, component capabilities, and other factors. In one embodiment, the first reflective element 430 comprises a beam splitter that directs approximately 90% of the light toward the second reflective element 440 (and subsequently to the pixel array 335), and approximately 10% of the light toward the photodiode 390. As shown in FIG. 4, only one photodiode 390 may be needed for laser range finding. Thus, only one subassembly 400-2 has a photodiode 390. However, to help ensure the images provided to the pixel array 335 by each subassembly 400 are substantially similar, the subassembly 400-1 without the photodiode 390 may have a first reflective element 430-1 that is a beam splitter, which substantially mirrors the functionality of the beam splitter in the subassembly 400-2 with the photodiode 390 (e.g., the beam splitters in both subassemblies 400 operate to reflect substantially the same amount of light).

In some embodiments, the elements may be steerably mounted to help enable the elements to be steered such that the image is centered on the pixel array 335. In one embodiment, for example, the first reflective element 430 is mounted using a plurality of screws around its periphery, which attach the first reflective element 430 to a mount. The screws can then be adjusted (e.g., at the time of manufacture) to modify the tip-tilt of the first reflective element 430 such that light reflected by the first reflective element 430 is properly centered on the pixel array 335.

Embodiments may further enable adjustment of the focal point by adjusting the first lens group 410 and/or the second lens group 420. In one embodiment, for example, the first lens group 410 is adjustably mounted, enabling the lens group to be moved forward or backward along the optical axis (e.g., at the time of manufacture) to help ensure that light is focused properly on the pixel array 335.

FIG. 7 is a simplified block diagram 700 of electrical components of an optical device 100, according to an embodiment. As illustrated, components may include a processing unit 710, orientation sensor(s) 720, laser transmitter 730, photodiode 740, SWIR camera 750, communication interface 760, control panel 770, complementary metal-oxide semiconductor (CMOS) camera 780, and/or a display 790. Alternative embodiments may add, omit, separate, and/or combine components, depending on desired functionality. A person of ordinary skill in the art will recognize many variations.

The processing unit 710 can, among other things, manage the various electrical components, interaction with a user, and communication with one or more other devices. In some embodiments, the processing unit may further act as a ballistic computer by gathering information from the sensors 720, SWIR camera, the communication interface 760, and/or other components (including sensors that may not be illustrated) and calculating a ballistic solution. In some embodiments, the processing unit 710 may identify and track a target in an image provided by the SWIR camera 750 and/or CMOS (visible light) camera 780. In some embodiments, the ballistic solution may be provided as an offset aim point (OAP), which may be communicated on the display 790 and/or via the communication interface. The processing unit may further operate the laser transmitter 730 and photodiode 740 to take measurements for range finding, and calculate a solution. Similarly, the processing unit may further operate the laser transmitter 730 and the SWIR camera 750 to take wind sensing measurements, and the processing unit 710 may execute algorithms to determine a direction and/or strength of a crosswind based on the measurements. The processing unit may employ any combination of hardware and/or software to perform the functions described herein.

Sensors 720 can include one or more orientation sensors, movement sensors, temperature sensors, barometric sensors, location sensors, and the like. Movement sensors can include, for example, a compass, gyroscope, and/or accelerometer. Location sensors can include Global Positioning System (GPS) (e.g., the GPS receiver 220 of FIG. 2), Global Navigation Satellite System (GNSS), and/or other location systems. The orientation sensors can include a magnetic compass, celestial compass, inclinometer, accelerometer, and/or other systems to sense the azimuth, elevation, heading, and other orientation information regarding the optical device 100. Other sensors and components also can be communicatively coupled to the optical device 100 (e.g., via the communication interface 760).

As previously indicated, the display 790 can be used to provide an image to a user of the optical device 100 and/or to provide a graphical user interface. The image shown on the display can be obtained and/or derived from an image captured by the SWIR camera 750 and/or the CMOS camera 780. In some embodiments, a user may navigate through a user interface shown on the display 790 by pressing one or more buttons on a control panel 770. In some embodiments, a touchscreen display may be employed 790 in addition or as an alternative to the control panel 770.

The communication interface 760 can be used to communicate with one or more other devices. As previously indicated, communication can be wireless (e.g., using radio frequency (RF), infrared signals, etc.), wired, optical, or the like. The communication interface 760 may utilize a communication port such as the communication port 260 of FIG. 2. Devices with which the optical device 100 may communicate may include a riflescope display, a spotting scope, a smart phone (or other mobile electronic device), and the like.

The laser transmitter 730 may include a laser and/or any electronics utilized in the operation thereof. The laser transmitter 730 may include a laser module such as the laser module 340 of FIG. 3. The laser transmitter 730 may further include controls for adjusting optics (e.g., steering transmitted laser light, controlling beam divergence, etc.) of a transmission optical assembly such as the transmission optical assembly 310 of FIG. 3.

Various components may be described herein as being "configured" to perform various operations. Those skilled in the art will recognize that, depending on implementation, such configuration can be accomplished through design, setup, placement, interconnection, and/or programming of the particular components and that, again depending on implementation, a configured component might or might not be reconfigurable for a different operation.

Computer programs incorporating various features of the present invention may be encoded on various computer readable storage media; suitable media include magnetic media, optical media, flash memory, and the like. Computer-readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

While the principles of the disclosure have been described above in connection with specific embodiments, it is to be clearly understood that this description is made only by way of example and not as limitation on the scope of the disclosure. Additional implementations and embodiments are contemplated. For example, the techniques described herein can be applied to various forms of optical devices, which may comprise a smaller portion of a larger optical system. Yet further implementations can fall under the spirit and scope of this disclosure.

What is claimed is:

1. An optical device for laser wind sensing, the optical device comprising:
a laser transmitter;
a camera;
receiving optics comprising first and second subassemblies, wherein each of the first and second subassemblies are configured to cause at least a portion of light entering the subassembly to travel through a first set of one or more lenses, through a second set of one or more lenses, reflect off of a first reflective element, and reflect off of a second reflective element toward a set of pixels of the camera;

a photodiode, wherein the first reflective element for one or both of the first or second subassemblies includes a beam splitter configured to direct a portion of the light toward the photodiode; and a processing unit configured to determine, from the portion of the light directed toward the photodiode, a range of an object from the optical device;

wherein the first and second subassemblies are configured to direct light toward first and second sets of pixels of the camera, respectively.

2. The optical device for laser wind sensing of claim 1, further comprising a body housing the laser transmitter, the camera, and the receiving optics, wherein the body comprises aluminum.

3. The optical device for laser wind sensing of claim 1, wherein the processing unit further configured to determine, from the light directed toward the first and second sets of pixels of the camera, a direction of wind with respect to the optical device.

4. The optical device for laser wind sensing of claim 3, further comprising a display configured to display an indication of the determined direction of wind.

5. The optical device for laser wind sensing of claim 1, wherein, for each of the first and second subassemblies, the first set of one or more lenses, the second set of one or more lenses, or both, include a negative silicon lens.

6. The optical device for laser wind sensing of claim 1, wherein each of the first and second subassemblies further comprises a narrow-band filter.

7. The optical device for laser wind sensing of claim 1, wherein each of the first and second subassemblies further comprises a field stop disposed between the first set of one or more lenses and the second set of one or more lenses.

8. The optical device for laser wind sensing of claim 1, wherein, for each of the first and second subassemblies, the first reflective element is steerably mounted within the subassembly to enable an adjustment of a direction in which the light travels.

9. The optical device for laser wind sensing of claim 1, wherein, for each of the first and second subassemblies, the first set of one or more lenses is adjustably mounted to enable an adjustment of a focal point of the light.

10. A stereoscopic optical assembly for laser wind sensing, the optical assembly comprising:

first and second subassemblies, wherein each of the first and the second subassemblies comprise elements including:
 a first set of one or more lenses;
 a second set of one or more lenses;
 a first reflective element;
 a second reflective element; and
 wherein, for each of the first and second subassemblies, the elements are configured to cause at least a portion of light entering the subassembly to travel through the first set of one or more lenses, through the second set of one or more lenses, reflect off of the first reflective element, and reflect off of the second reflective element toward an output of the subassembly;

a camera comprising a pixel array having first set of pixels and a second set of pixels;

a photodiode, wherein the first reflective element for one or both of the first or second subassemblies includes a beam splitter configured to direct a portion of the light toward the photodiode; and a processing unit configured to determine, from the portion of the light directed toward the photodiode, a range of an object from the optical assembly;

wherein:
 the output of the first subassembly is configured to direct light toward the first set of pixels of the camera, and
 the output of the second subassembly is configured to direct light toward the second set of pixels of the camera.

* * * * *

UNITED STATES PATENT AND TRADEMARK OFFICE
CERTIFICATE OF CORRECTION

PATENT NO.         : 9,678,099 B2
APPLICATION NO.    : 14/696004
DATED              : June 13, 2017
INVENTOR(S)        : Tony Maryfield et al.

It is certified that error appears in the above-identified patent and that said Letters Patent is hereby corrected as shown below:

On the Title Page

Under (72) Inventors section 2nd name:
Change "Mahyar Dadkah" to "Mahyar Dadkhah"

Signed and Sealed this
First Day of August, 2017

Joseph Matal
*Performing the Functions and Duties of the*
*Under Secretary of Commerce for Intellectual Property and*
*Director of the United States Patent and Trademark Office*